United States Patent
Gill

(10) Patent No.: US 6,693,420 B1
(45) Date of Patent: Feb. 17, 2004

(54) CONTROL APPARATUS HAVING A PULSE INDUCTION POSITION SENSOR

(76) Inventor: Michael John Gill, Keeping House, Bucklers Hard, Beaulieu, Hampshire, SO42 7XA (GB)

(*) Notice: Subject to any disclaimer, the term of this patent is extended or adjusted under 35 U.S.C. 154(b) by 0 days.

(21) Appl. No.: 09/807,930
(22) PCT Filed: Aug. 12, 1999
(86) PCT No.: PCT/GB99/02656
§ 371 (c)(1), (2), (4) Date: Jul. 9, 2001
(87) PCT Pub. No.: WO00/25093
PCT Pub. Date: May 4, 2000

(30) Foreign Application Priority Data

Oct. 22, 1998 (GB) .............................. 9823159

(51) Int. Cl.[7] .............................. G01D 5/20; G01B 7/14
(52) U.S. Cl. .............................. 324/207.16; 624/207.2; 624/207.26
(58) Field of Search ....................... 324/207.16, 207.22, 324/207.23, 207.24, 207.25, 207.26, 326, 329, 234, 236

(56) References Cited

U.S. PATENT DOCUMENTS 5,453,685 A  9/1995  Gould et al.
5,712,563 A  1/1998  Ohta et al.

FOREIGN PATENT DOCUMENTS

GB  2207270  1/1989

Primary Examiner—Walter E. Snow
(74) Attorney, Agent, or Firm—Clark & Brody

(57) ABSTRACT

Control apparatus comprising at least one electrically-conductive target portion (12). A position sensor (14) in the form of a pulse induction device is arranged in proximity with the said at least one electrically-conductive portion (12) to provide a signal indicative of a position attribute of that portion. Relative movement is possible between the target portion (12) and a coil portion (14a) of the position sensor (14). Control means (16) are connected to receive such a signal from the pulse induction device (14) and to respond in dependence upon that signal.

The invention extends to such a position sensor (14) itself.

19 Claims, 16 Drawing Sheets

CONTROL APPARATUS HAVING A PULSE INDUCTION POSITION SENSOR

TECHNICAL FIELD

This invention relates to the art of electronic control apparatus.

BACKGROUND ART

The present invention relates to control apparatus comprising at least one electrically-conductive target portion, and a position sensor in the form of an electromagnetic device arranged in proximity with the said at least one electrically-conductive target portion to provide a signal indicative of an attribute of the position of that portion relative to a portion of the electromagnetic device, and control means connected to receive such a signal from the electromagnetic device and to respond in dependence upon that signal, in which the electromagnetic device comprises electrically-conductive coil means, electrical pulse generating means connected to the coil means to deliver electrical pulses thereto, and measuring means also connected to the coil means to measure the voltage or other electrical parameter across the coil means at a predetermined time interval after each pulse.

Such apparatus is described in U.S. Pat. No. 5,712,563. This apparatus comprises a conventional variable inductance device.

SUMMARY OF THE INVENTION

The present invention seeks to provide apparatus with improved accuracy.

Accordingly, a first aspect of the present invention is directed to control apparatus having the construction set out in the opening paragraph of the present specification, in which the electromagnetic device is a pulse induction device, so that, subsequent to a pulse, the decay of the voltage or other electrical parameter across the coil means is slowed in relation to what it would have been had the electrically-conductive target been absent, and in which the measuring means are such as to provide a measure of the voltage or other electrical parameter across the coil means at a time when that measure would have been substantially zero had the target been absent, so that the excitation energy has died away.

The pulse induction device may comprise at least two coil portions which are spaced apart from one another or which diverge from one another, the portions defining a volume with the coil portions surrounding that volume, and the latter extending between those portions, the target portion and/or the coil portions being movable whilst the target portion remains within that volume, the electrical pulse generating means being connected to both the said at least two coil portions to deliver electrical pulses thereto, and the measuring means being connected to both the said at least two coil portions to provide a measure of the voltage or other electrical parameter across the coil portions, and thus to provide a signal indicative of an attribute of the position of the target portion within the said volume relative to the coil portions.

The target portion may be movable. It may be fixed relative to an accelerator pedal, with the control apparatus comprising an engine, and the control means comprising a device for varying the speed of the engine in dependence upon the signal it receives from the pulse induction device According to a second aspect of the present invention, there is provided a position sensor characterised by coil means in the form of at least two electrically-conductive coil portions, which are spaced apart from one another or which diverge from one another, these portions defining a volume with the coil portions surrounding that volume and the latter extending between those portions, electrical pulse generating means connected to the coil portions to deliver electrical pulses thereto, and measuring means also connected to the coil portions to provide a measure of the voltage or other electrical parameter across the coil portions, so as to provide a signal, the magnitude of which is substantially proportional to an attribute of the position of an electrically-conductive target portion within the said volume relative to the coil portions when the sensor is in use, the coil portions, electrical pulse generating means and the measuring means together constituting a pulse induction device, so that, subsequent to a pulse, the decay of the voltage or other electrical parameter across the coil portions is slowed in relation to what it would have been had the electrically-conductive target been absent, and in that the measuring means are such as to provide a measure of the voltage or other electrical parameter across the coil portions at a time when that measure would have been substantially zero had the target been absent, so that the excitation energy has died away.

The at least two coil portions may be spaced apart portions of a single coil, which is preferably elongate along its axis of winding or alternatively transversely of its axis of winding.

Alternatively, the said two coil portions may be independently energisable, and the electrical pulse generating means may be such as to apply pulses to the two coil portions alternately in such a manner that there is no pulse delivered to one of the coil portions when the other is being energised, and vice versa, and, in such a manner that there is a delay period between each pulse to enable the voltage or other parameter across each coil portion to be measured without interference from the other coil portion.

Preferably, each coil portion is in the shape of a right-angled quadrilateral.

Preferably, respective parts of the two coil portions are adjacent or contiguous, and preferably the two coil portions are set at an angle in the range from 50° to 170° to one another, preferably in the range from 95° to 150°, most preferably about 100°. This provides the benefit of an output signal from the induction device being substantially linear with respect to a relative displacement of the said electrically-conductive target portion in a direction which is transverse of the said contiguous sides.

It is possible to thereby obtain a range of movement with a linear response say for the target portion which is four times that for a single coil arrangement, whilst the coil arrangement might be no more than one and a half times as large.

The two coil format permits a compact sensor to be constructed, and in particular reduces the size of the coils. This is highly beneficial in avoiding significant influence from the materials surrounding the sensor in use, for example mounting brackets and structural metal work. The coils cannot inherently distinguish between an intended target and any other conductive material within range, but small coils diminish this range.

Further, the two coil format provides cancellation of such interfering effects where both coils are being affected. Complete cancellation is obtained if such interfering effects are equal in each coil.

The combined effect of small coils and the tendency to cancel interference effects typically permits an unshielded dual coil sensor to be mounted directly to steel structures with minimal constraints.

Coils are a form of antenna, and keeping the coils small substantially reduces the reception of electromagnetic interference.

The cancellation effect also permits the incorporation of close fitting metal shielding within the sensor where external interference effects (structural or electromagnetic) would otherwise be unacceptable.

Position attributes in two degrees of freedom of relative movement of the target portion can be ascertained if the position sensor has two pairs of coil portions, each pair having the features of the said at least two coil portions, and the two pairs being arranged orthogonally in relation to one another.

According to a third aspect of the present invention, there is provided a position sensor comprising an electrically-conductive coil portion, electrical pulse generating means connected to the coil portion to deliver electrical pulses thereto, and measuring means also connected to the coil portion to provide a measure of the voltage or other electrical parameter across the coil portion, and thus to provide a signal indicative of an attribute of the relative position of an electrically-conductive target portion in relation to the coil portion, in which the target portion is hollow, and relative movement is possible between the target portion and the coil portion, with the coil portion remaining within the target portion, when the sensor is in use, and in that the electrical pulse generating means constitute a pulse induction device, so that, subsequent to a pulse, the decay of the voltage or other electrical parameter across the coil portion is slowed in relation to what it would have been had the electrically-conductive target been absent, and in that the measuring means are such as to provide a measure of the voltage or other electrical parameter across the coil portion at a time when that measure would have been substantially zero had the target been absent, so that the excitation energy has died away.

Such constructions are useful for instrumentation of pneumatic and hydraulic cylinders.

In each of the said first, second and third aspects of the present invention, it will be appreciated that the coil portion or portions and/or the target portion may be movable.

BRIEF DESCRIPTION OF THE DRAWINGS

Examples of apparatus and position sensors made in accordance with the present invention will now be described with reference to the accompanying drawings, in which.

DETAILED DESCRIPTION OF THE PREFERRED EMBODIMENTS

Figure 1:
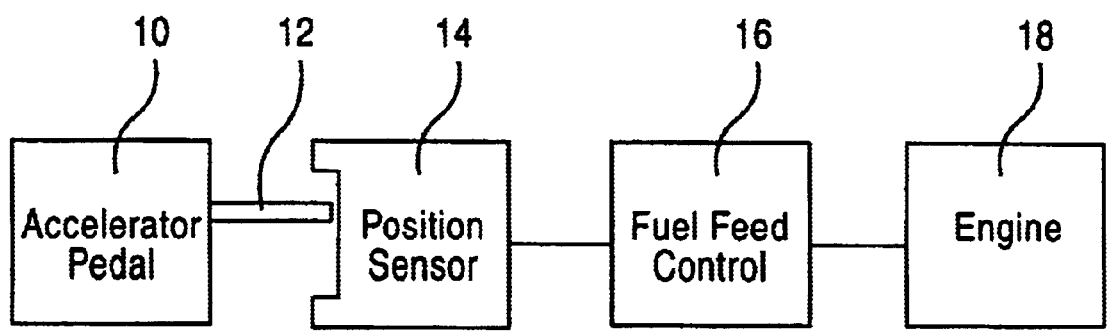
FIG. 1 is a diagrammatic representation of control apparatus embodying the present invention.

The control apparatus shown in FIG. 1 comprises an accelerator pedal 10 having an electrically-conductive ferrous-metal target portion 12 physically coupled thereto, a position sensor 14 in close proximity to the electrically-conductive portion 12, and a fuel feed control 16 connected to an engine 18 to vary the speed thereof.

Depression of the pedal 10 causes a linear movement of the electrically-conductive portion 12 which is detected by the position sensor 14, the output of which is received by the fuel feed control means 16 which as a result increases the speed of the latter. However, there is no wear between the electrically-conductive portion 12 and the sensor 14 because there is no physical contact or connection therebetween.

Figure 2:
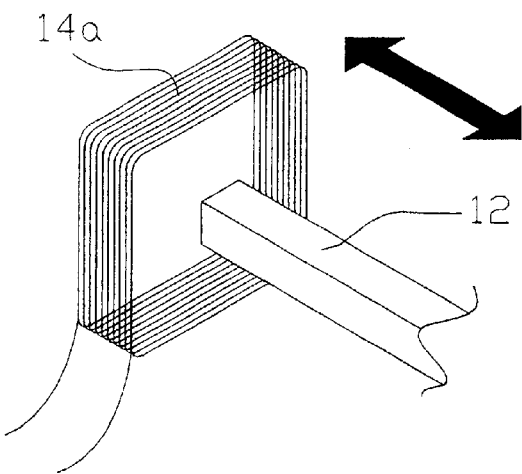
FIG. 2 is a perspective view of parts of further apparatus embodying the present invention.

One simple form of parts of the apparatus shown- in FIG. 1 is shown in FIG. 2, comprising an elongate rod as the target portion 12, and a single generally square interlaced coil 14a as part of the position sensor 14. The response of the apparatus is plotted on the vertical axis against linear axial position of the target portion 12 along the axis on the horizontal axis in FIG. 3.

Figure 3:
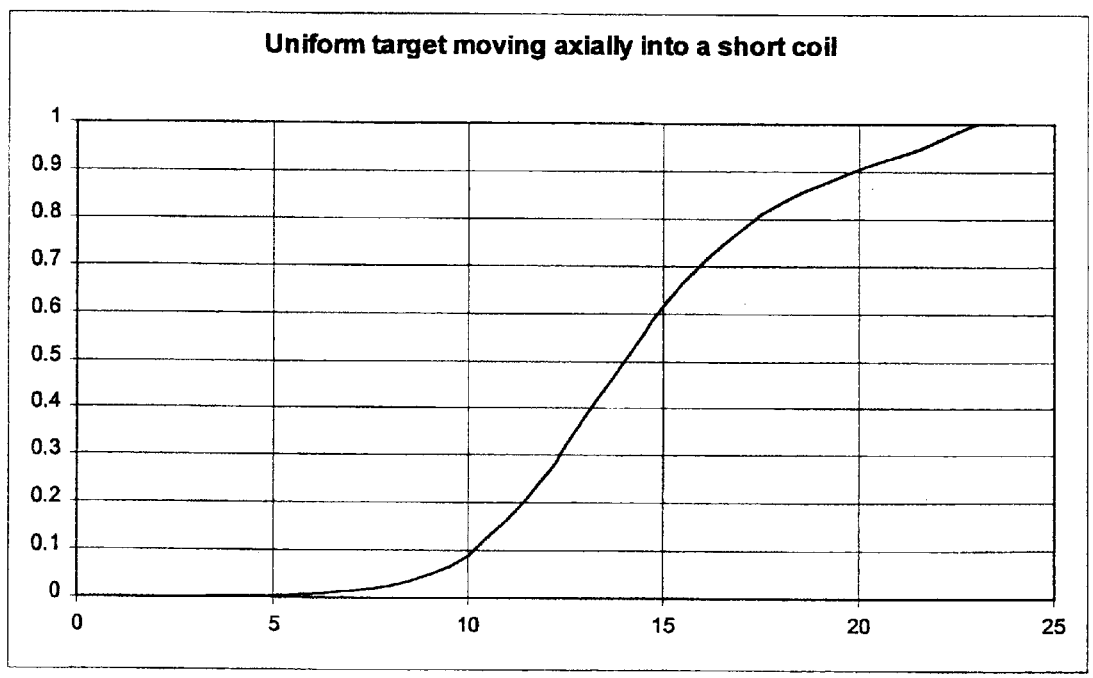
FIG. 3 is an explanatory graph.
Figure 4:
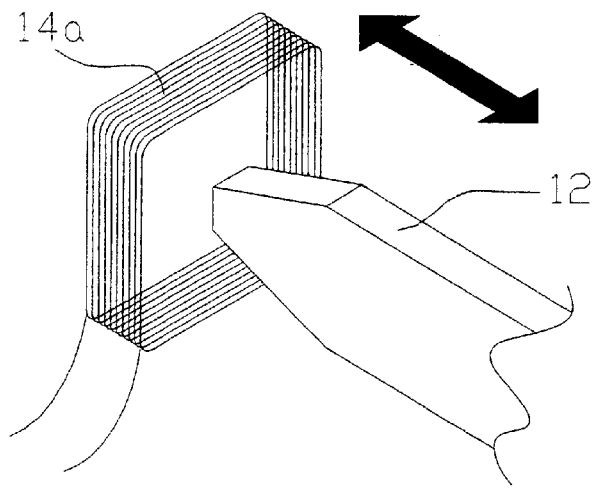
FIG. 4 is a perspective view of further modified apparatus embodying the present invention.
Figure 5:
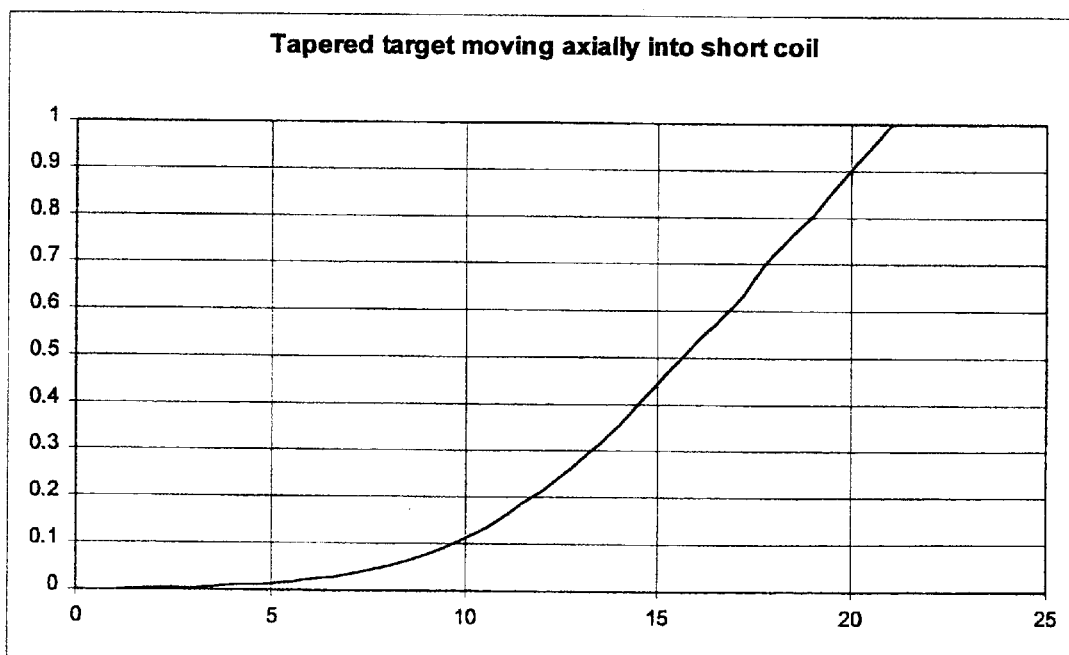
FIG. 5 is a further explanatory graph.

FIGS. 4 and 5 correspond respectively to FIGS. 2 and 3, but with a tapered target portion 12. The graph shows a higher degree of linearity for greater displacement.

FIGS. 6a to 6e show parts of the sensor 14 and their relative position in relation to the electrically-conductive portion 12 of a further form of the apparatus shown in FIG. 1 in greater detail. Thus, the part of the sensor shown in these Figures comprises a hollow box of nylon or other electrically non-conductive plastics material, moulded into the shape of an open bottomed box. The box is generally elongate. A first transverse slot 22 is machined across the outside of the top of the box in each side of the box, on the outside thereof, are machined two slanting slots 24 which extend downwardly from one end of the slot 22 to respective corners of the box, with the angle between the two slots 24 being approximately 100°. Lastly, there are two end slots 26 machined across the bottoms of the end walls of the box 20.

Two windings 28 of copper filament or other electrically-conductive wire are wound around the box, each winding being generally rectangular with one side of the rectangle seated in the slot 22, the opposite side of one of the windings being in one of the slots 26 and the opposite side of the other winding being in the other slot 26 with the other sides of the two windings seated in the slanting slots 24. Thus, the two windings 28 diverge from one another, from their sides which are contiguous and which are both seated in the slot 22, with an angle of about 100° between them.

Figure 6D:
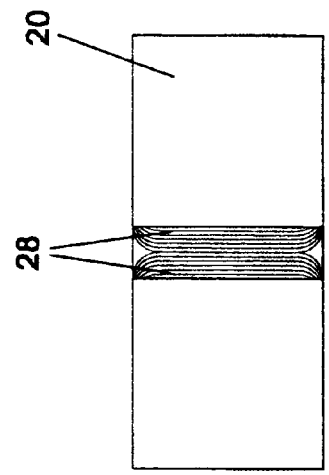
FIGS. 6a to 6e show, respectively, side, bottom, end, top and perspective views of part of a position sensor of the control apparatus shown in FIG. 1.
Figure 6A:
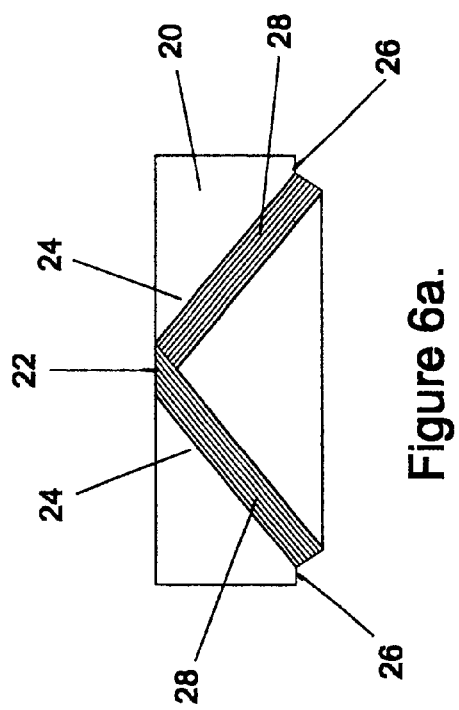
Figure 6B:
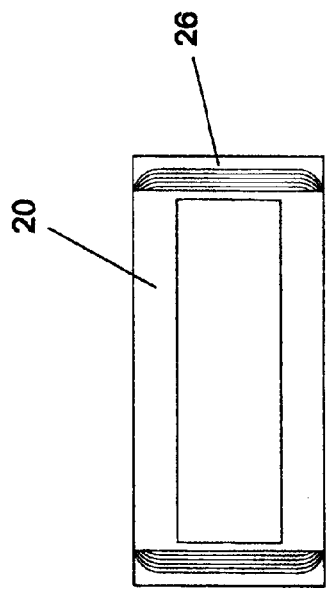
Figure 6C:
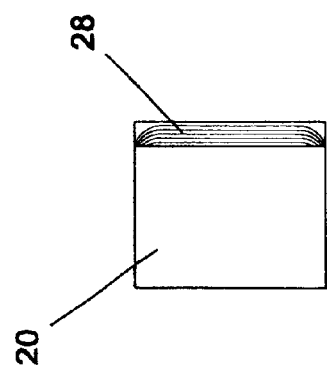
Figure 6E:
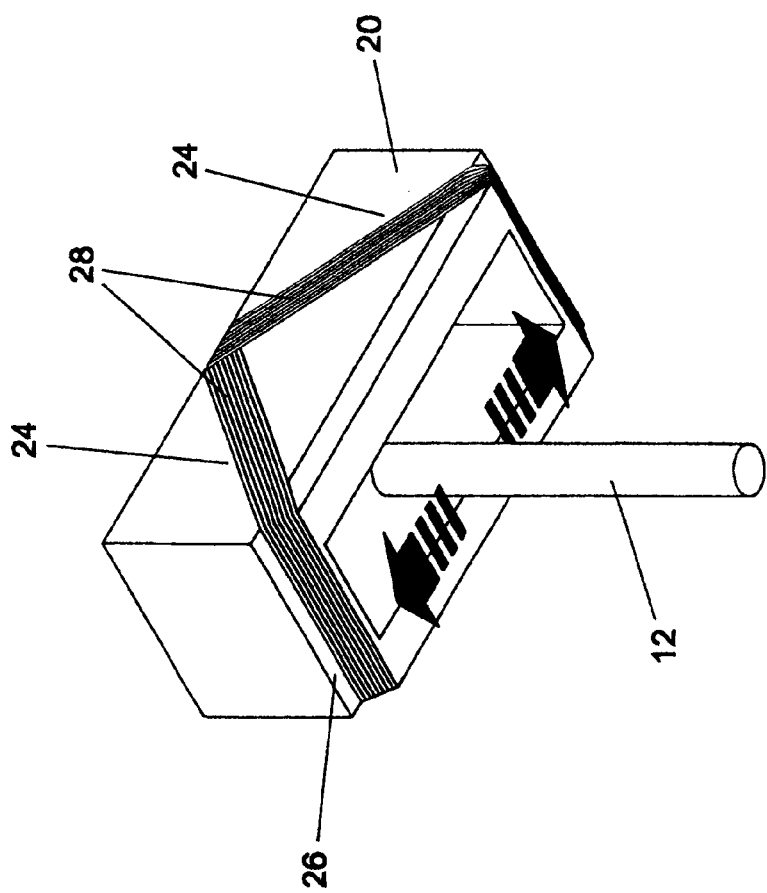

As can be seen from FIG. 6e, the electrically-conductive portion 12 has an upper end received within the interior of the box 20 without touching any part of that box, this end being within a volume defined by the windings 28. The windings surround that volume, and the volume extends between the windings.

Figure 7:
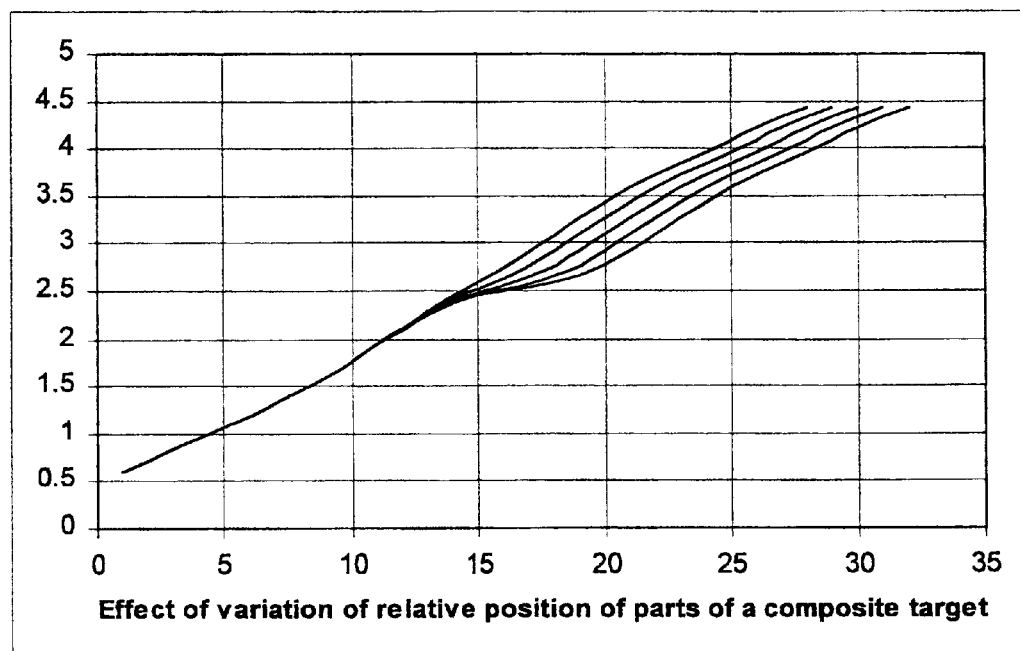
FIGS. 7 and 8 show further explanatory graphs.
Figure 8:
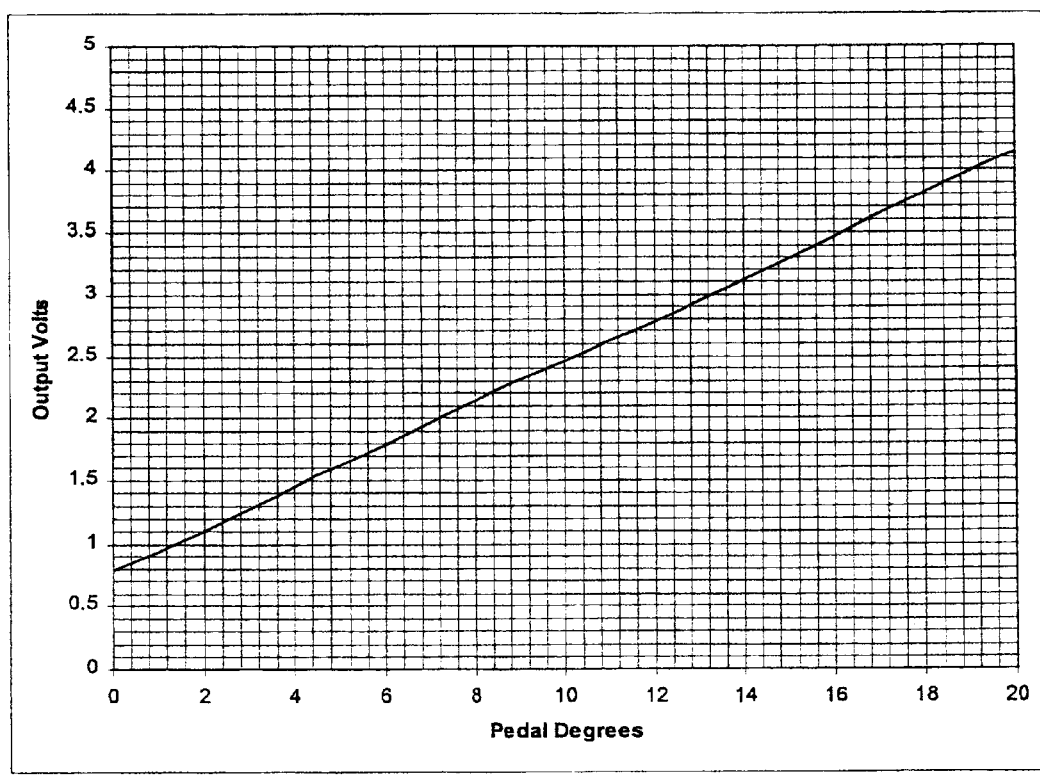

FIG. 7 shows output plotted against target position when the latter is composite, providing two target portions which are physically fixed in position relative to one another and which are provided with respective different coil portions the outputs from which are subtracted. The different curves show different relative positions of the two target portions, one of which can be seen to provide a substantially linear output for the full movement range. This is also shown in FIG. 8, where the composite target is secured to an accelerator foot pedal, and the output in volts is shown as a function of rotation of the pedal in degrees.

Figure 9:
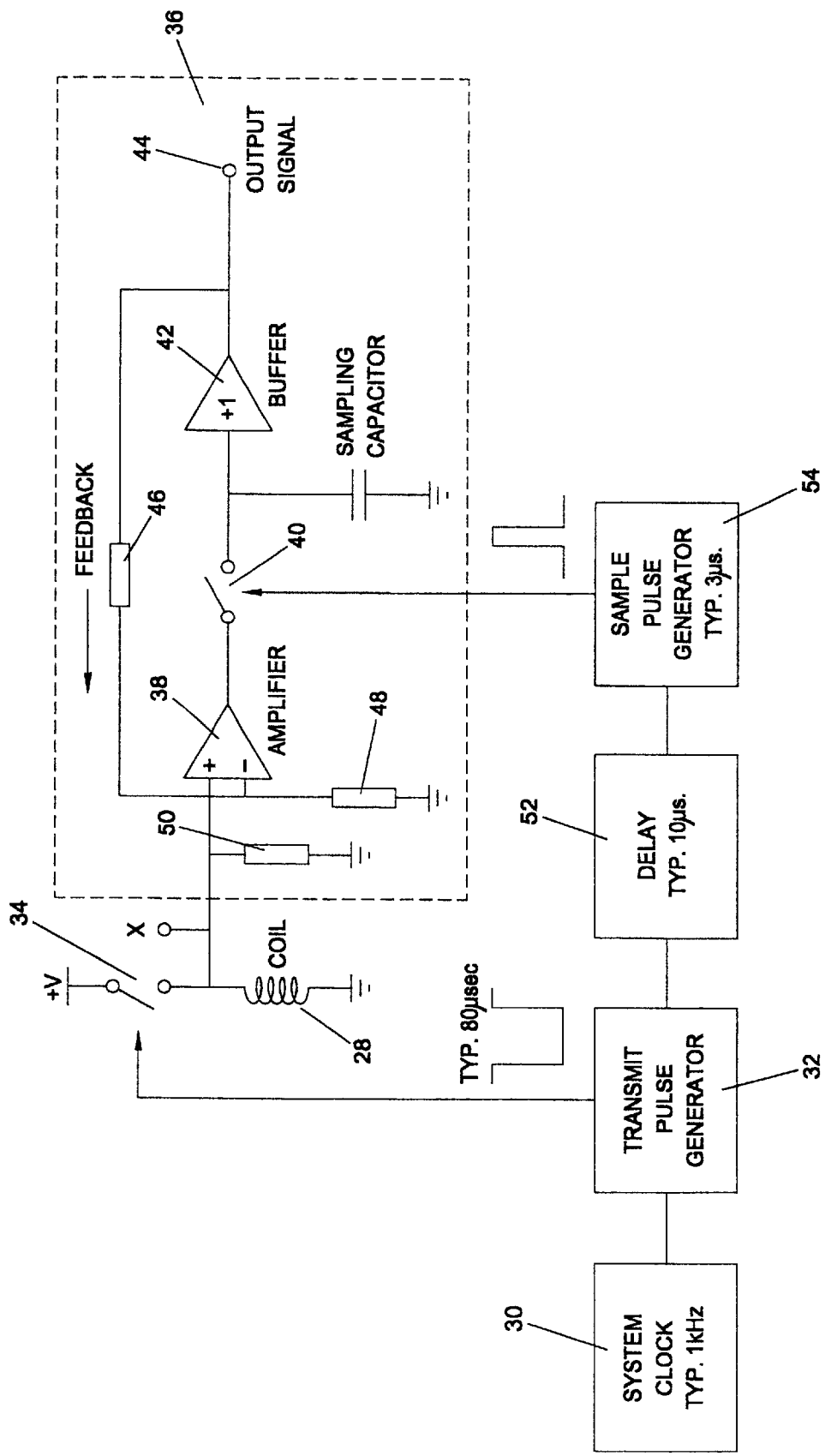
FIG. 9 shows a block circuit diagram of the electrical circuitry for one of the coils of the part of the position sensor shown in FIGS. 6a to 6e.

The block circuit diagram shown in FIG. 9 shows circuitry used in conjunction with one of the windings 28. This comprises a system clock 30 connected to deliver clock pulses to a pulse generator 32. This delivers a 80 μsec switching pulse to a switch 34 so that, during that time, the switch is closed and the voltage of about 5 volts is connected to one end of the winding 28, the other being earthed. Also connected across the coil are voltage measuring means 36 comprising a differential amplifier 38, a switch 40 and buffer amplifier 42 connected in series with one another with an output signal 44 being taken from the output of the buffer amplifier 42, the positive input to the differential amplifier being connected to the non-earthed end of the winding 28 and the negative input of the differential amplifier being connected to a point between two series connected resistors 46 and 48 constituting a feedback from the buffer amplifier 42 and connected to earth. The positive connection to the differential amplifier 38 is also connected to earth by a resistor 50.

A time delay 52 is also connected to the pulse generator 32, and a pulse generator 54 generating a pulse of approximately 3 μsec is connected to receive a signal from a delay 52 and cause the switch 40 to be closed for that pulse period.

Figure 11:
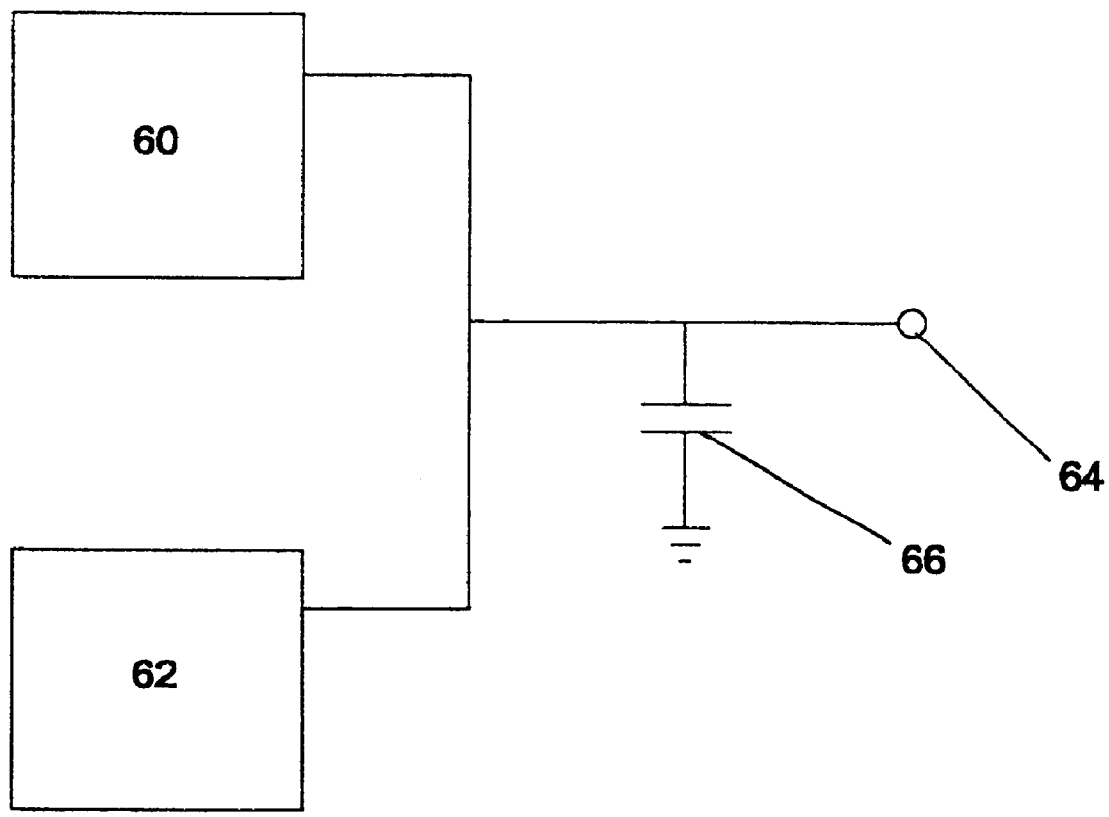
FIG. 11 shows a further circuit diagram of the control apparatus shown in FIG. 1.

Circuitry as shown in FIG. 9 is provided for each coil 28. Such circuitry is represented in FIG. 11 by the box labelled 60 for one of the windings 28 and by the box labelled 62 for the other winding 28. These may be connected to a common output 64, having a smoothing capacitor 66, to provide an overall output which is in effect the measure provided by one of the windings subtracted from the other. This gives a generally linear output in proportion to the linear displacement of the electrically-conductive portion 12 within the box 20.

Thus, when the apparatus is in use, the circuitry shown in FIG. 9 operates for each winding 28 with the pulses being transmitted to the two windings 28 asynchronously so that when one is energised, the other is not, and vice versa, and such that there is a delay period between each pulse when neither winding is energised to avoid a measurement by one of the windings interfering with that of the other.

Figure 10:
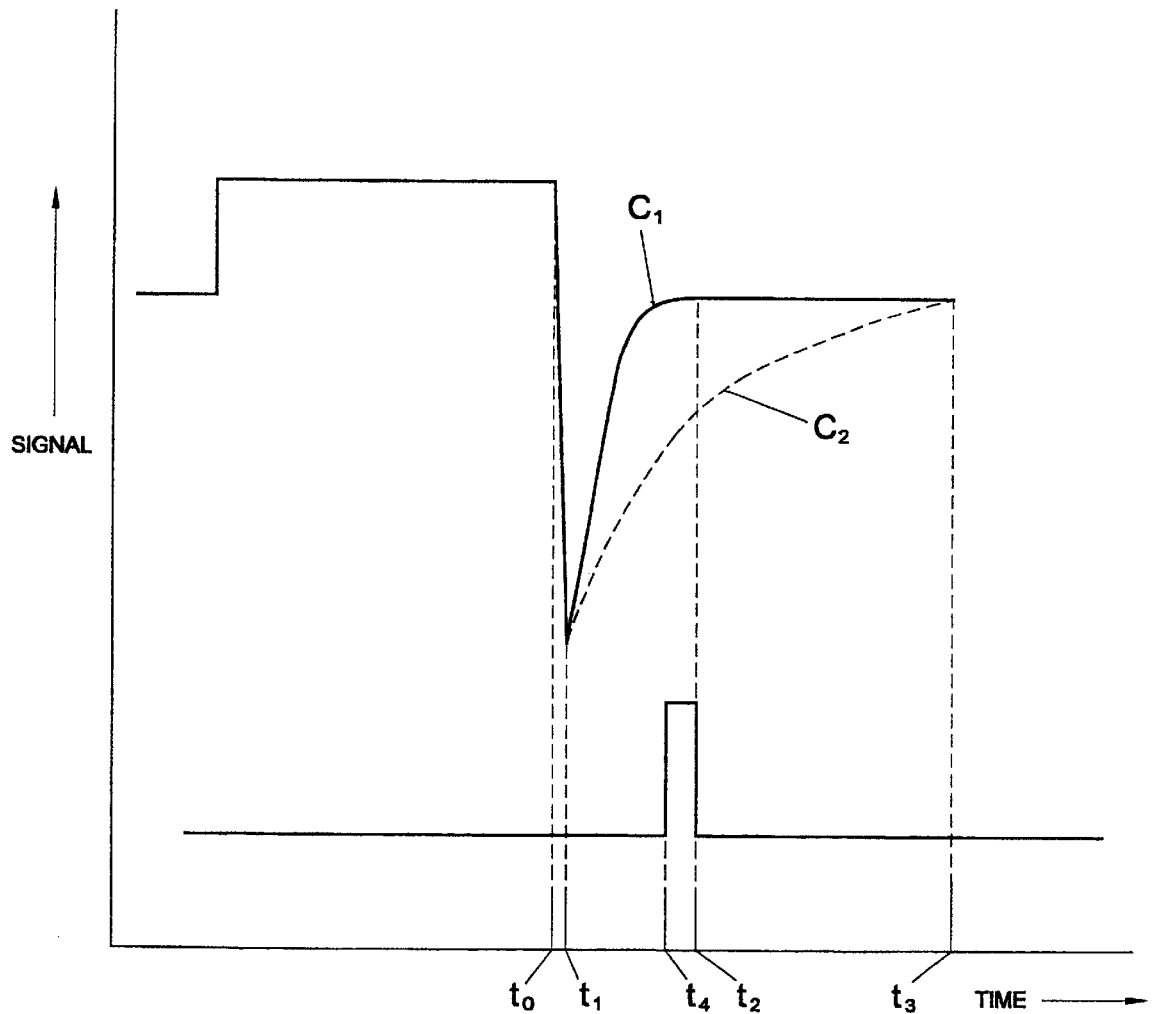
FIG. 10 shows a further explanatory graph.

Considering the operation of the circuitry shown in FIG. 9 for one of the windings 28, the system clock 30 causes the pulse generator 32 to close the switch 34 for a period of approximately 80 μsec. This energises the winding 28 for that period such that the voltage across the winding has a step function as shown in the graph in FIG. 10. When this pulse ends at time t0 in FIG. 10, the self-inductance of the winding 28 causes the voltage across it to fall sharply to a negative value of a magnitude well in excess of the 5 volts it had initially, whereafter at time t1 it starts to rise again and to reach zero value at about time t2 following an exponential curve C1 between time t1 and t2. However, with the presence of the electrically-conductive portion 12, it follows the broken curve C2, in which the decay of a negative voltage across the winding 28 is slowed down so that the voltage does not come to zero value again until about time t3, well after time t2. The actual measure of this decay influence is measured by that part of the circuitry shown in the box 36 of FIG. 3. Thus, the switch 40 receives the pulse which closes it for about 3 μsec, about 10 μsec after the winding 28 was de-energised (by which time the excitation energy has completely died away). This therefore provides a measure of the voltage across the winding 28 at time t4, about 20 μsec after time t0 and lasting for about a period of 3 μsec.

The signal at the output 54 is delivered to the fuel feed control 16 shown in FIG. 1, which in turn varies the speed of the engine 18 substantially linearly with respect to displacement of the accelerator pedal 10.

Figure 12:
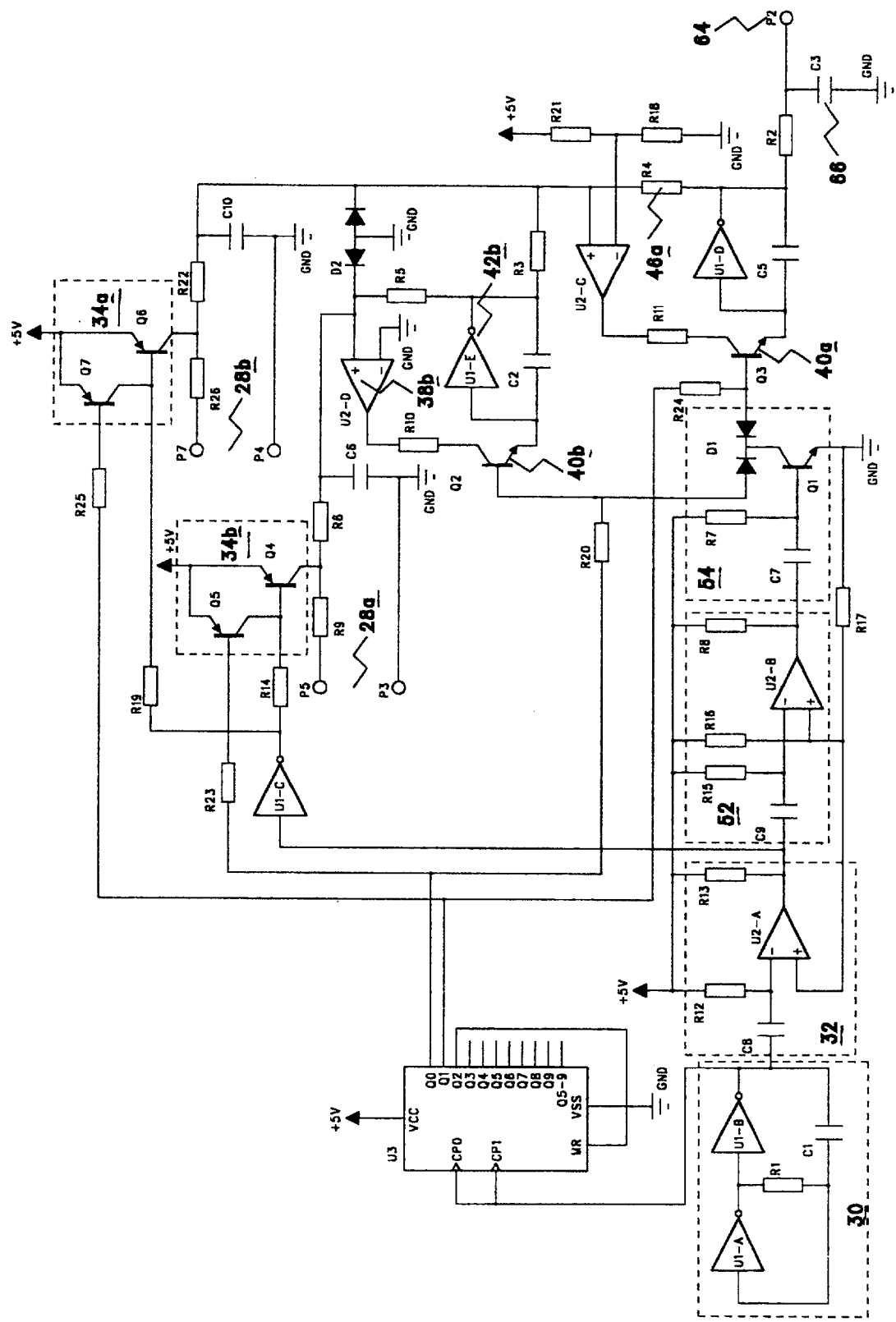
FIG. 12 shows the circuitry of FIGS. 9 and 11 in greater detail.

FIG. 12 shows the circuitry of FIGS. 9 and 11 in greater detail, with corresponding parts of the circuitry in the Figures bearing the same reference numerals, save that where a part of the circuitry in FIG. 12 relates to one of the windings 28, it has the suffix a, and where a part of the circuitry in FIG. 12 relates to the other winding 28, it has the suffix b.

Figure 13A:
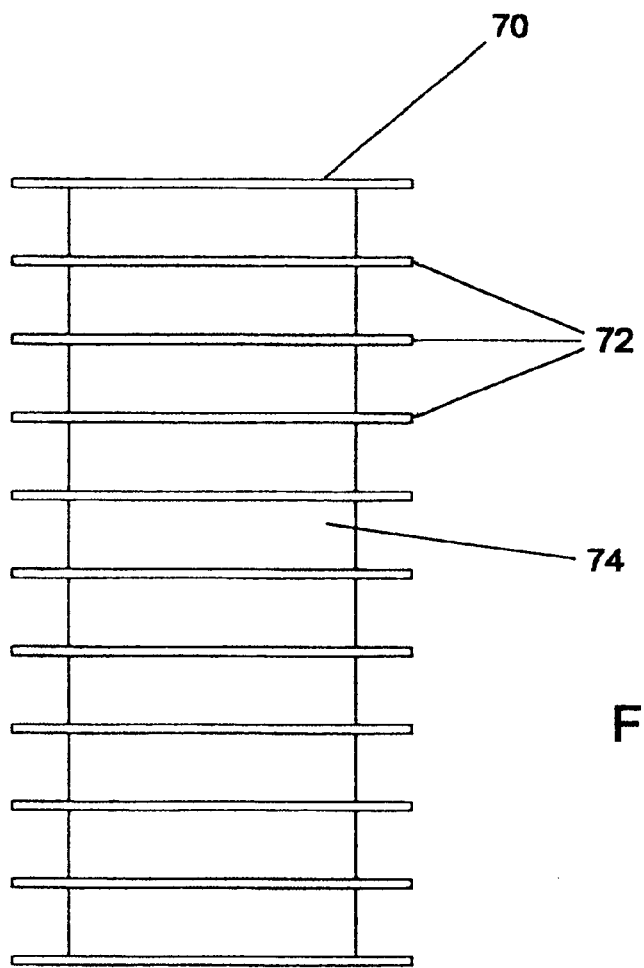
FIGS. 13a and 13b show side and end views of an alternative construction to the part shown in FIGS. 6a to 6e.
Figure 13B:
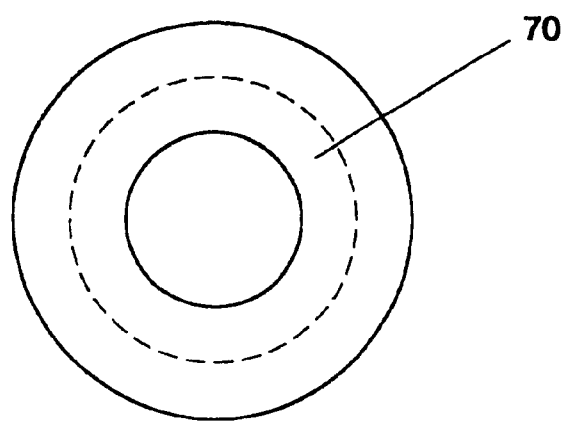
Figure 14D:
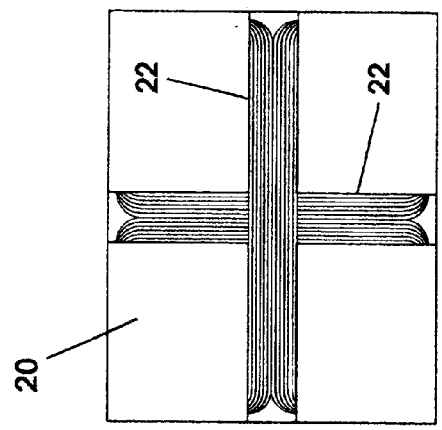
FIGS. 14a to 14e show possible modifications to the part shown in FIGS. 6a to 6e, Figures of the same letter being of corresponding view.
Figure 14A:
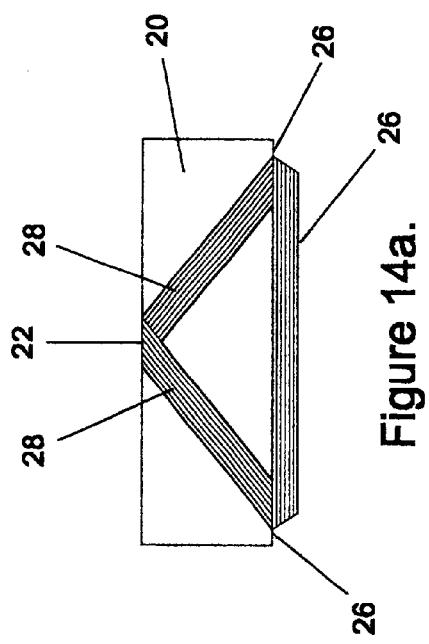
Figure 14B:
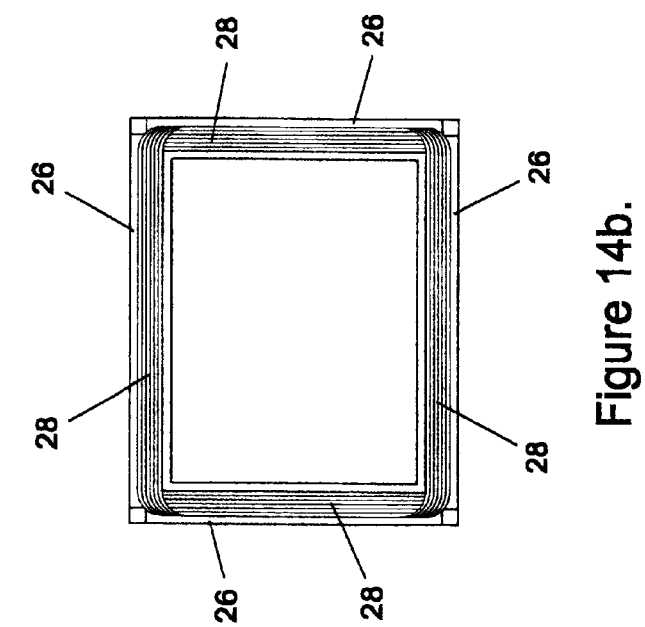
Figure 14C:
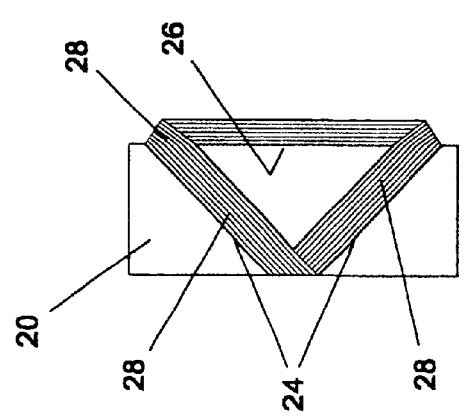
Figure 14E:
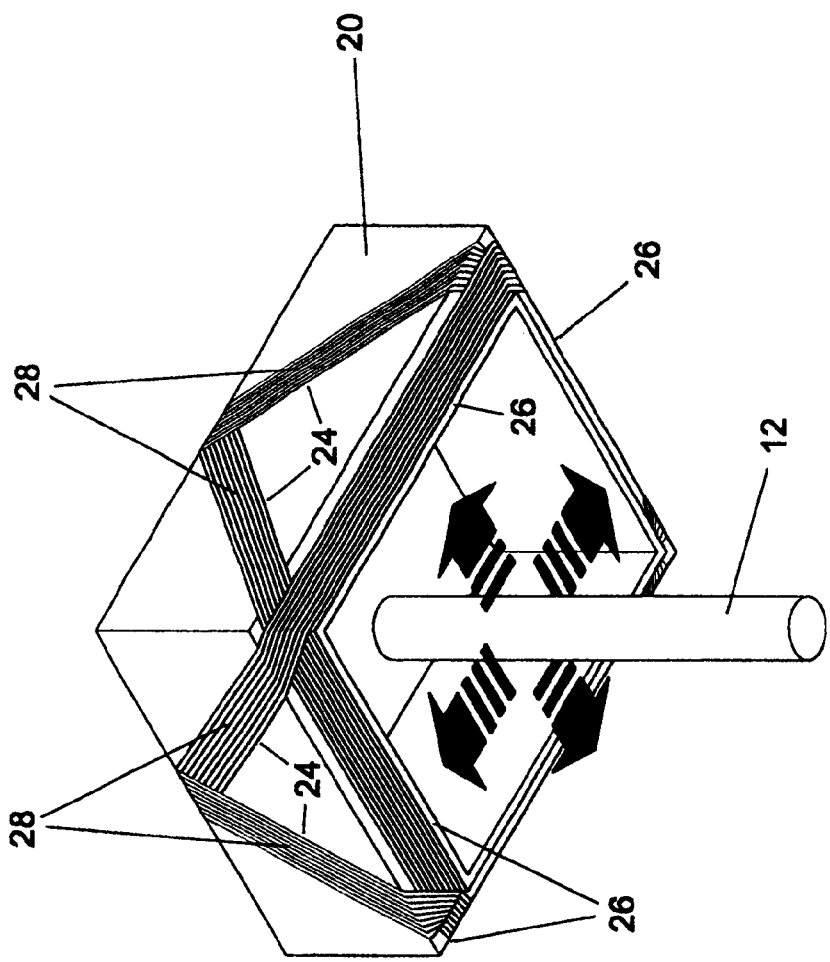

In the modification of the position sensor shown in FIGS. 13a and 13b, the box 20 has been replaced by a hollow cylinder 70, with spacers 72 and a single elongate coil 74 wound around the cylinder 70 with suitable slots (not shown) being formed in the spacers 72 to enable the winding to be continuous along the length of the cylinder 70. In this case, the movable electrically-conductive portion 12 (not shown in FIGS. 13a and 13b) would extend into the interior of the cylinder 70, without touching it, and would move in its longitudinal direction.

The modification to the position sensor shown in Figures 14a to 14e, comprises an increase in the width of the box 20, and the provision of two pairs of windings, each pair being wound in substantially the same fashion as in the two windings of the position sensor part shown in FIGS. 6a to 6e, and each pair being orthogonally arranged to the other pair. The reference numerals used in FIGS. 14a to 14e correspond to those used in FIGS. 6a to 6e. It will be appreciated that with such a construction, the position of the electrically-conductive portion 12 can be determined with respect to two degrees of freedom, so that it is possible to determine the position of the electrically-conductive portion 12 both along the length of the box 20 and also across its width. One such application for such a position sensor is to determine both the relative position along two orthogonal axes of a joystick, the outputs from the position sensor being used to position a tool and/or a machine tool table in both of two orthogonal axes, or to vary the speed of movement of the tool and/or machine tool table in these directions. In another such application, such a joystick provided with such a position sensor could be used to control a radio-controlled vehicle or toy.

Numerous variations and modifications to the illustrated embodiments may occur to the reader without taking the result outside the scope of the present invention. For example, the box 20 with the coils 28 may be enclosed in an aluminium or copper casing to minimise the effect of external fields whilst still enabling useful measurements to be made.

Further variations and modifications will now be described with reference to FIGS. 15 to 22.

Figure 15:
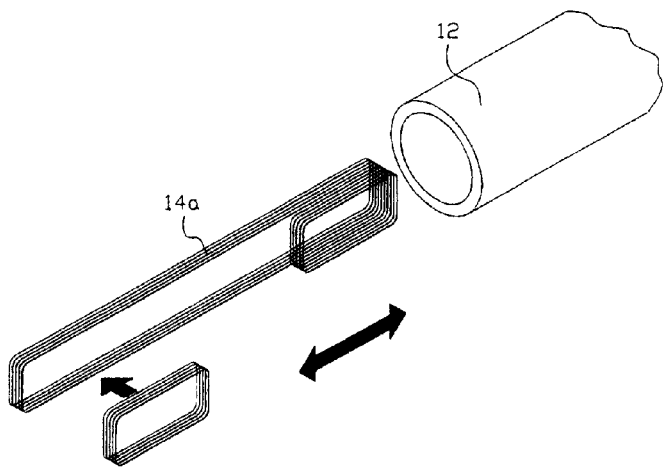
FIG. 15 shows a perspective view of further modified apparatus embodying the present invention.
Figure 15A:
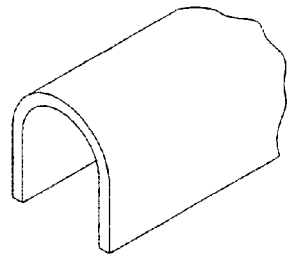
FIG. 15a shows a perspective view of a modified part of the apparatus shown in FIG. 15.

The modified apparatus shown in FIG. 15 has coiled portions 14a, a main one of which is elongate transversely of its winding axis and two end coil portions overlapping the ends of the main elongate coiled portion, the latter being movable into and out of a tubular target portion 12. The latter may be modified so that it has an inverted U-shape as shown in FIG. 15a.

Figure 16:
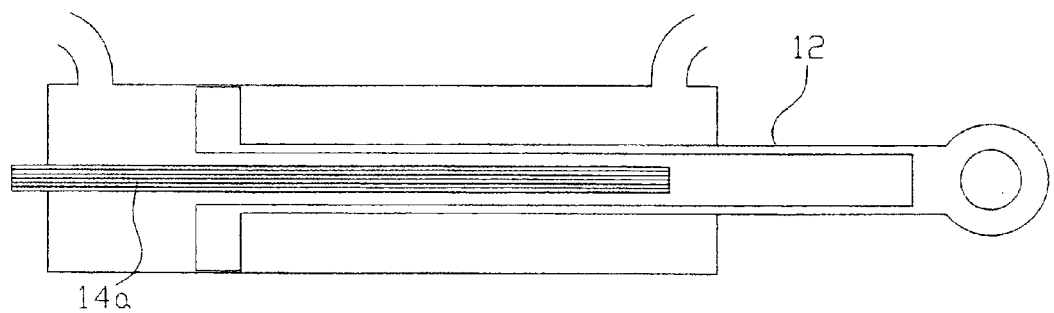
FIGS. 16 and 19 show respective further embodiments of the present invention in diagrammatic form.

In the modified apparatus of FIG. 16, the coil 14a is also elongate and the target portion 12 is tubular, being a hollow piston rod of a piston and cylinder arrangement, so that the apparatus of which the coil and target portions are parts determines the position of the piston rod of this arrangement.

Figure 17:
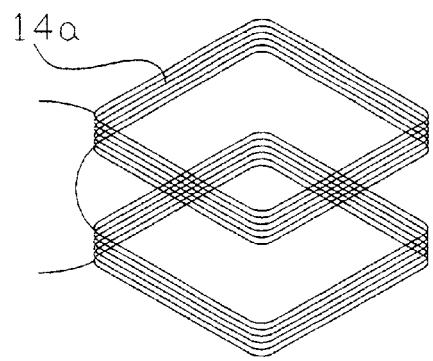
FIG. 17 shows a perspective view of parts of further apparatus made in accordance with the present invention.

FIG. 17 shows a possible construction for the coil 14a as two coil portions spaced apart, having a common winding axis, and being electrically connected in series with one another. These coils allow for a short overall construction.

Figure 18:
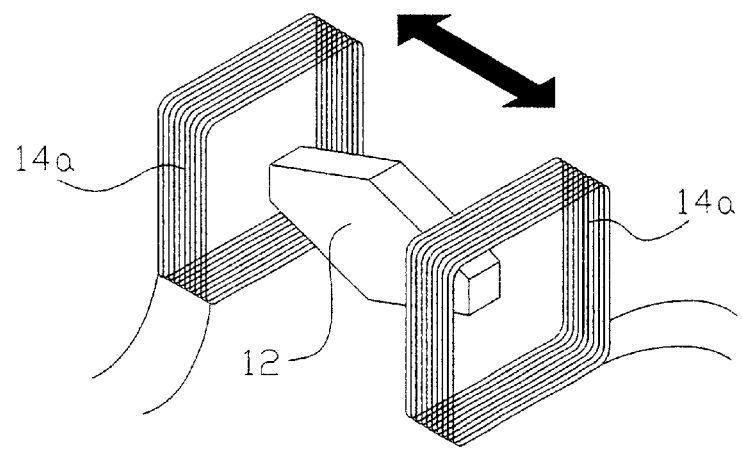
FIGS. 18 and 20 to 22 show respective further perspective views of respective further embodiments of the present invention.

FIG. 18 shows a construction having two coils 14a which are spaced apart, having a common winding axis, but being connected separately to a position sensor (not shown in FIG. 18), so as to provide signals which are subtracted from one another to give a substantially linear response, that being further enhanced by the target portion 12, which is composite and which has two tapered ends each movable into and out of the volumes surrounded respectively by the coil portions.

Figure 19:
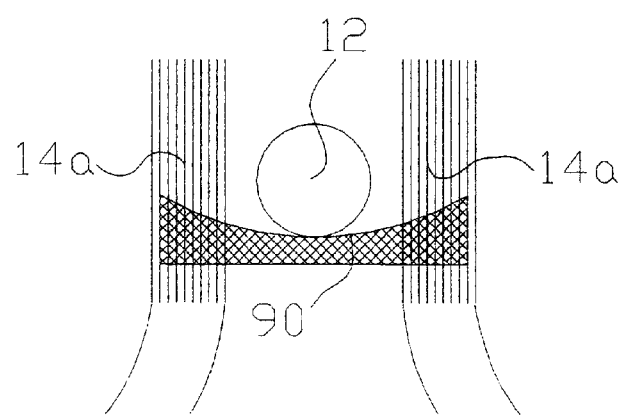

In the apparatus of which a part is shown in FIG. 19, the coils 14a are arranged as shown in FIG. 18, but the target portion comprises a steel ball 12, which is free to roll on a part spherical dish 90, so that the apparatus is able to measure tilt, and could comprise a tilt switch. This arrangement may be enclosed and within oil for lubrication and damping.

Figure 20:
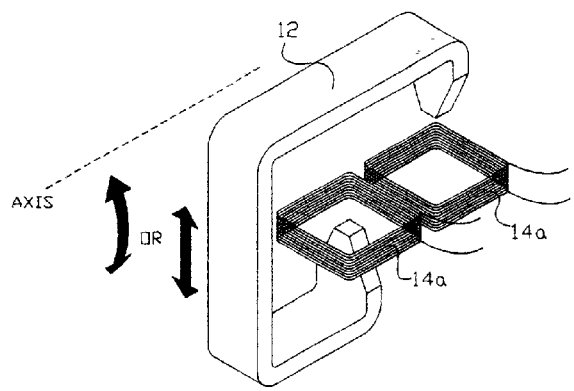

In the arrangement of FIG. 20, the coils 14a are placed alongside one another with the respective axes of winding parallel with one another, and the target portion 12 is again composite, comprising a yoke with a tapered end on the axis of one of the coils 14a and another tapered end on the axis of the other of the coils 14a, the yoke being arranged to be movable linearly along a direction parallel to the coil axes, the ends of the target portion 12 extending in opposite directions so that as one end approaches its coil 14a, the other leaves its coil 14a whilst travelling in the same direction, and vice versa. The same effect is obtainable with a motion of the yoke about an axis which is displaced from the coils and which is parallel to a line passing through the centres of the coils 14a.

Figure 21:
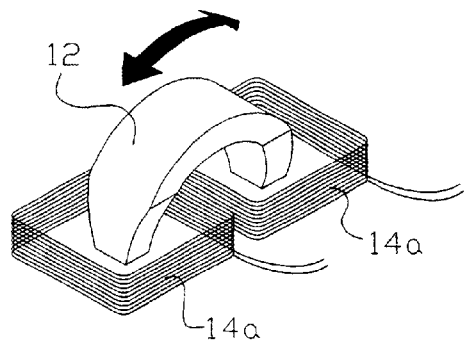

In the modification shown in FIG. 21, the yoke is generally semi-circular, with its ends generally at the respective centres of the coils 14a, possible movement of the yoke being a rocking motion about the centre of the circle on which it lies.

Figure 22:
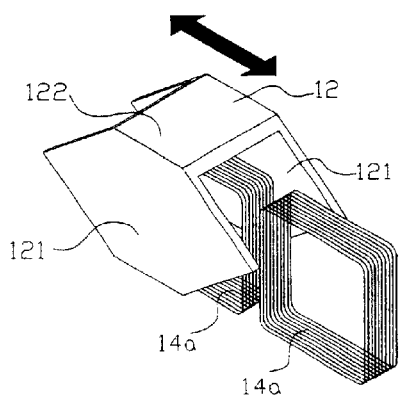

In the construction shown in FIG. 22, the target is hollow, comprising two generally trapezoidal sides 121 connected above by a bridging portion 122. This is linearly movable to receive, to an increasing or decreasing extent, two coils arranged as in FIGS. 20 and 21, the sides 121 being parallel to the coils 14a.

Each of the coils 14a in the arrangements shown in FIGS. 18 to 22 may comprise the composite coil construction shown in FIG. 17.

The portions of a composite target could be separate.

The targets may be made of steel, aluminium, brass or other electrically-conductive metal alloy or other electrically-conductive material.

The electrically-conductive material of the target is advantageously magnetically permeable, as is steel for example.

What is claimed is:

1. Control apparatus comprising at least one electrically-conductive target portion (12), and a position sensor in the form of an electromagnetic device (14) arranged in proximity with the said at least one electrically-conductive target portion (12) to provide a signal indicative of an attribute of the position of that portion relative to a portion of the electromagnetic device (14), and control means (16) connected to receive such a signal from the electromagnetic device (14) and to respond in dependence upon that signal, in which the electromagnetic device (14) comprises electrically-conductive coil means (28), electrical pulse generating means (32) connected to the coil means (28) to deliver electrical pulses thereto, and measuring means (38, 54) also connected to the coil means (28) to measure the voltage or other electrical parameter across the coil means (28) at a predetermined time interval after each pulse characterised in that the electromagnetic device (14) is a pulse induction device (14), so that, subsequent to a pulse, the decay of the voltage or other electrical parameter across the coil means (28) is slowed in relation to what it would have been had the electrically-conductive target (12) been absent, and in that the measuring means (38, 54) are such as to provide a measure of the voltage or other electrical parameter across the coil means (28) at a time when that measure would have been substantially zero had the target (12) been absent, so that the excitation energy has died away.

2. Control apparatus according to claim 1, characterised in that the pulse induction device (14) comprises at least two coil portions (28) which are spaced apart from one another or which diverge from one another, the portions defining a volume with the coil portions (28) surrounding that volume, the latter extending between those portions, the target portion (12) and/or the coil portions (28) being movable whilst the target portion (12) remains within that volume, the electrical pulse generating means (32) being connected to both the said at least two coil portions (28) to deliver electrical pulses thereto, and the measuring means (38, 54) being connected to both the said at least two coil portions (28) to provide a measure of the voltage or other electrical parameter across the coil portions (28) and thus to provide a signal indicative of an attribute of the position of the target portion (12) within the said volume relative to the coil portions (28).

3. Control apparatus according to claim 1, characterised in that the target portion (12) is movable.

4. Control apparatus according to claim 3, characterised in that the apparatus comprises an engine, the movable target portion (12) is fixed relative to an accelerator pedal, and the control means comprises a device for varying the speed of the engine in dependence upon the signal it receives from the pulse induction device (14).

5. A position sensor characterised by coil means in the form of at least two electrically-conductive coil portions (28) and which are spaced apart from one another or which diverge from one another, these portions (28) defining a volume with the coil portions (28) surrounding that volume and the latter extending between those portions (28), electrical pulse generating means (32) connected to the coil portions (28) to deliver electrical pulses thereto, and measuring means (38, 54) also connected to the coil portions (28) to provide a measure of the voltage or other electrical parameter across the coil portions, so as to provide a signal, the magnitude of which is substantially proportional to an attribute of the position of an electrically-conductive target portion (12) within the said volume relative to the coil portions (28) when the sensor is in use, the coil portions (28), electrical pulse generating means (32) and the measuring means (38, 54) together constituting a pulse induction device (14), so that, subsequent to a pulse, the decay of the voltage or other electrical parameter across the coil portions (28) is slowed in relation to what it would have been had the electrically-conductive target (12) been absent, in which the measuring means (38, 54) are such as to provide a measure of the voltage or other electrical parameter across the coil portions (28) at a time when that move would have been substantially zero had the target (12) been absent, and the excitation energy has died away, the two coil portions (28) being independently energisable, and the electrical pulse generating means (32) being such as to apply pulses to the two coil portions (28) alternately in such a manner that there is no pulse delivered to one of the coil portions (28) when the other is being energised, and vice versa, and, in such a manner that there is a delay period between each pulse to enable the voltage or other electrical parameter across each coil portion (28) to be measured without interference from the other coil portion (28).

6. A position sensor according to claim 5, characterised in that the at least two coil portions (28) are spaced apart portions of a single coil.

7. A position sensor according to claim 6, characterized in that the said single coil is elongate along its axis of winding.

8. Control apparatus or position sensor according to claim 5, characterised in that the two coil portions (28) are independently energisable, and the electrical pulse generating means (32) are such as to apply pulses to the two coil portions (28) alternately in such a manner that there is no pulse delivered to one of the coil portions (28) when the other is being energised, and vice versa, and, in such a manner that there is a delay period between each pulse to enable the voltage or other electrical parameter across each coil portion (28) to be measured without interference from the other coil portion (28).

9. A position sensor according to claim 5, characterised in that each coil portion (28) is in the shape of a right-angled quadrilateral.

10. A position sensor according to claim 5, characterised in that respective parts of the two coil portions (28) are contiguous.

11. A position sensor according to claim 5, characterised in that the two coil portions (28) are set at an angle to one another.

12. A position sensor according to claim 11, characterised in that the said angle is in the range from 50° to 170°.

13. A position sensor according to claim 12, characterized in that the said angle is in the range from 95° to 150°.

14. A position sensor according to claim 13, characterised in that the said angle is about 100°.

15. A position apparatus according to claim 14, characterised in that the position sensor (14) has two pairs of coil portions (28), each pair having the features of the said at least two coil portions (28), and the two pairs (28) being arranged orthogonally in relation to one another, thereby to enable position attributes in two degrees of freedom of movement of the movable control member to be ascertained.

16. A position sensor according to claim 5, characterised in that an electrically-conductive casing surrounds the or each coil portion (28) and the electrically-conductive portion (12) which moves when the apparatus or sensor is in use.

17. In combination, a position sensor comprising an electrically-conductive coil portion (14a), electrical pulse generating means (32) connected to the coil portion (14a) to deliver electrical pulses thereto, and measuring means (38, 54) also connected to the coil portion (14a) to provide a measure of the voltage or other electrical parameter across the coil portion (14a), and thus to provide a signal indicative of an attribute of the relative position of an electrically-conductive target portion (12) in relation to the coil portion (14a), and a control device (16) connected to receive such a signal from the electromagnetic device (14) and to respond in dependence upon that signal, characterised in that the target portion (12) is hollow, and relative movement is possible between the target portion (12) and the coil portion (14a), with the coil portion (14a) remaining within the target portion (12), when the sensor is in use, and in that the electrical pulse generating means constitute a pulse induction device (14), so that, subsequent to a pulse, the decay of the voltage or other electrical parameter across the coil portion (14a) is slowed in relation to what it would have been had the electrically-conductive target (12) been absent, and in that the measuring means (38, 54) are such as to provide a measure of the voltage or other electrical parameter across the coil portion (14a) at a time when that measure would have been substantially zero had the target (12) been absent, so that the excitation energy has died away.

18. A position sensor according to claim 5, characterised in that the electrically-conductive target portion (12) comprises magnetically permeable material.

19. A position sensor characterised by coil means in the form of at least two electrically-conductive coil portions (28) and which are spaced apart from one another or which diverge from one another, these portions (28) defining a volume with the coil portions (28) surrounding that volume and the latter extending between those portions (28), electrical pulse generating means (32) connected to the coil portions (28) to deliver electrical pulses thereto, and measuring means (38, 54) also connected to the coil portions (28) to provide a measure of the voltage or other electrical parameter across the coil portions, so as to provide a signal, the magnitude of which is substantially proportional to an attribute of the position of an electrically-conductive target portion (12) within the said volume relative to the coil portions (28) when the sensor is in use, the coil portions (28), electrical pulse generating means (32) and the measuring means (38, 54) together constituting a pulse induction device (14), so that, subsequent to a pulse, the decay of the voltage or other electrical parameter across the coil portions (28) is slowed in relation to what it would have been had the electrically-conductive target (12) been absent, in which the measuring means (38, 54) are such as to provide a measure of the voltage or other electrical parameter across the coil portions (28) at a time when that move would have been substantially zero had the target (12) been absent, and the excitation energy has died away and the position sensor (14) has two pairs of coil portions (28), each pair having the features of the said at least two coil portions (28), and the two pairs (28) being arranged orthogonally in relation to one another, thereby to enable position attributes in two degrees of freedom of movement of the movable control member to be ascertained.

* * * * *